United States Patent [19]
Grace

[11] Patent Number: 5,748,098
[45] Date of Patent: May 5, 1998

[54] EVENT CORRELATION

[75] Inventor: Andrew Grace, Ipswich, United Kingdom

[73] Assignee: British Telecommunications public limited company, London, England

[21] Appl. No.: 507,314

[22] PCT Filed: Feb. 22, 1994

[86] PCT No.: PCT/GB94/00344

§ 371 Date: Aug. 29, 1995

§ 102(e) Date: Aug. 29, 1995

[87] PCT Pub. No.: WO94/19912

PCT Pub. Date: Sep. 1, 1994

[30] Foreign Application Priority Data

Feb. 23, 1993 [EP] European Pat. Off. ............ 93301293

[51] Int. Cl.$^6$ .......................... G06F 15/177; H04Q 1/00
[52] U.S. Cl. .................. 340/825.16; 340/825.07; 340/825.36; 340/825.06; 370/242; 370/245; 395/200.11; 395/180
[58] Field of Search .................... 340/825.16, 825.36, 340/825.32, 825.07, 506, 522; 370/242, 245; 455/67.1; 395/200.11, 180, 181, 182.18, 183.01

[56] References Cited

U.S. PATENT DOCUMENTS

| | | | |
|---|---|---|---|
| 4,550,278 | 10/1985 | Yamanaka | 318/632 |
| 5,155,480 | 10/1992 | Pfeiffer | 340/825.06 |
| 5,265,103 | 11/1993 | Brightwell | 371/32 |
| 5,309,448 | 5/1994 | Bouloutas et al. | 371/29.1 |
| 5,334,970 | 8/1994 | Bailey | 340/506 |
| 5,528,759 | 6/1996 | Moore | 395/200.11 |

Primary Examiner—Michael Horabik
Assistant Examiner—Yonel Beaulieu
Attorney, Agent, or Firm—Nixon & Vanderhye P.C.

[57] ABSTRACT

Simultaneous events reported to an equipment management system are compared with historical data in order to establish whether there is a relationship between the events. Historical data is used to determined the statistical probability of the events occurring independently simultaneously. If this probability is below a predetermined threshold this will suggest that the events are not independent, but are relaxed. Such relationships are alerted to an operator, for example by highlighting or grouping on a screen display, assisting the operator in identification of related events, without the need for prior knowledge of the relationships in the system. The events may be alarms generated by faults in a network. The identification of related faults at different points in the network assists identification of their common cause. The historical database may be updated by further event occurrences as they are reported to the equipment management system, thereby enlarging the database to make the results more statistically accurate. Events may be reported to the system automatically or by human agency. To allow for systematic delays in event reporting, alarms from one source may be compared with alarms from another source occurring a fixed time later or earlier.

21 Claims, 6 Drawing Sheets

| RESOURCE ARm | NUMBER OF WINDOWS AR1 & ARm ACTIVE | No. AR1 ACTIVE | PROB. ARm ACTIVE | PROB. OF COINCIDENCE |
|---|---|---|---|---|
| AR1 | 5 | 5 | 0.5 | 0.031 |
| AR2 | 5 | 5 | 0.5 | 0.031 |
| AR5 | 5 | 5 | 0.5 | 0.031 |
| AR3 | 1 | 5 | 0.1 | 0.328 |
| AR6 | 1 | 5 | 0.1 | 0.328 |
| AR4 | 5 | 5 | 0.9 | 0.590 |

Fig. 4b.

| RESOURCE ARm | No. OF WINDOWS AR3 & ARm | No. AR3 ACTIVE | PROB. ARm ACTIVE | PROB. OF COINCIDENCE |
|---|---|---|---|---|
| AR3 | 1 | 1 | 0.1 | 0.100 |
| AR6 | 1 | 1 | 0.1 | 0.100 |
| AR1 | 1 | 1 | 0.5 | 0.500 |
| AR2 | 1 | 1 | 0.5 | 0.500 |
| AR5 | 1 | 1 | 0.5 | 0.500 |
| AR4 | 1 | 1 | 0.9 | 0.900 |

Fig. 4c.

| RESOURCE ARm | No. OF WINDOWS AR4 & ARm | AR4 ACTIVE | PROB. ARm ACTIVE | PROB. OF COINCIDENCE |
|---|---|---|---|---|
| AR1 | 5 | 9 | 0.5 | 0.246 |
| AR2 | 5 | 9 | 0.5 | 0.246 |
| AR5 | 5 | 9 | 0.5 | 0.246 |
| AR3 | 1 | 9 | 0.1 | 0.387 |
| AR4 | 9 | 9 | 0.9 | 0.387 |
| AR6 | 1 | 9 | 0.1 | 0.387 |

Fig. 5a.

| NETMON resource description | | | Alarm Arrival Rate | Correlation Probability |
|---|---|---|---|---|
| Rg | Origin | Designation | | |
| NE | LSB1 | LE/D8005DK 118 | 0.00168 | 2.56E-45 |
| NE | LSB1 | LE/D8007DK 119 | 0.00168 | 2.56E-45 |
| NE | LSB1 | LE/D8004DK 135 | 0.00168 | 2.56E-45 |
| NE | LSB1 | LE/D8009DK 143 | 0.00168 | 2.56E-45 |
| NE | LSB1 | LE/D3401DK 27 | 0.00168 | 2.56E-45 |
| NE | LSB1 | LE/D3402DK 34 | 0.00168 | 2.56E-45 |
| NE | LSB1 | LE/D1401DK 8 | 0.00168 | 2.56E-45 |
| NE | LSB1 | CB/E8001DK 81 | 0.00224 | 4.5E-43 |
| NE | LSB1 | CB/E3401DK 25 | 0.00224 | 4.5E-43 |
| NE | LSB1 | CB/E3402DK 26 | 0.00224 | 4.5E-43 |
| NE | LSB1 | CB/E8003DK 82 | 0.002352 | 1.08E-42 |
| NE | LSB1 | L/SS8001DK 65 | 0.002576 | 5.55E-42 |
| NE | LSB1 | L/SS8002DK 66 | 0.002576 | 5.55E-42 |
| S | EHL | LE8001  056 | 0.002016 | 4.04E-41 |
| S | EHL | ACE NO 1 | 0.004816 | 4.18E-37 |
| M | LED | LS/B1401DK 16 | 0.001568 | 2.79E-37 |
| M | LED | LS/B3401DK 19 | 0.001568 | 2.79E-37 |
| M | LED | LS/B3402DK 21 | 0.001568 | 2.79E-37 |
| M | LED | LS/B8005DK 58 | 0.001568 | 2.79E-37 |
| M | LED | LS/B8007DK 59 | 0.001568 | 2.79E-37 |
| M | LED | LS/B8004DK 68 | 0.001568 | 2.79E-37 |
| M | LED | LS/B8008DK 70 | 0.001568 | 2.79E-37 |
| M | LED | LS/B8009DK 73 | 0.001568 | 2.79E-37 |
| M | LED | LS/B8011DK 78 | 0.001568 | 2.79E-37 |
| NE | LSB1 | LE/D8011DK 262 | 0.00112 | 1.34E-33 |
| M | LED | EH/L8001DK 40 | 0.004144 | 5.75E-31 |
| M | LED | MR/N3411DK 193 | 0.001232 | 3.25E-30 |
| M | LED | DY/A3401DK 5 | 0.001232 | 3.25E-30 |
| M | LED | DY8001DK 36 | 0.001232 | 3.25E-30 |
| M | LED | DY8002DK 38 | 0.001232 | 3.25E-30 |
| NE | LSB1 | CB/E8004DK 329 | 0.001344 | 9.23E-30 |

FROM FIG.5a.      FROM FIG.5a.

| | | | | |
|---|---|---|---|---|
| M | LED | LE/D-DY F | 0.00168 | 1.34E-28 |
| M | LED | LE/D-LS G | 0.004928 | 1.55E-27 |
| M | LED | LE/D-SF E | 0.002352 | 7.5E-27 |
| M | LED | SF/A1401DK 10 | 0.001008 | 1.7E-25 |
| M | LED | SF/A3403DK 23 | 0.001008 | 1.7E-25 |
| M | LED | SF/D3404DK 11 | 0.001008 | 1.7E-25 |
| M | LED | SF/D8001DK 124 | 0.001008 | 1.7E-25 |
| M | LED | SF/D8006DK 287 | 0.001008 | 1.7E-25 |
| M | YCOK | @ENGINE RUN | 0.010529 | 6.19E-25 |
| NE | LSB1 | CB/E8005DK 330 | 0.00112 | 4.86E-25 |
| M | LED | SF8004DK 22 | 0.001344 | 3E-24 |
| NE | SFD | MR/R3404DK 3 | 0.001456 | 6.66E-24 |
| NE | SFD | CB/E3401DK 9 | 0.001568 | 1.4E-23 |
| NE | SFD | CB/E3402DK 14 | 0.001568 | 1.4E-23 |
| NE | SFD | LE/D1401DK 25 | 0.001568 | 1.4E-23 |
| L | CLB3 | 2-8 MUX 33-40 | 0.002912 | 2.65E-23 |
| NE | LSB1 | LE/D8008DK 231 | 0.000896 | 3.89E-23 |
| M | YCOK | POWER DEFRRD | 0.011089 | 1.2E-22 |
| NW | MRR | CB/E 3402 | 0.005488 | 1.86E-22 |
| NW | MRR | CB/E 8010 | 0.005488 | 1.86E-22 |
| NW | MRR | CB/E 8003 | 0.005488 | 1.86E-22 |
| NW | MRR | CB/E 8004 | 0.005488 | 1.86E-22 |
| NW | MRR | CL 8001 | 0.005488 | 1.86E-22 |
| NW | MRR | CB/E 8001 | 0.005488 | 1.86E-22 |
| NW | MRR | CB/E 8002 | 0.0056 | 2.37E-22 |
| NW | MRR | CB/E 3401 | 0.005712 | 3E-22 |
| NW | WA1 | 3G MUXS 126-133 | 0.002464 | 1.26E-21 |
| NE | SFD | MR/R8005DK* 9 | 0.001456 | 3.05E-21 |
| NW | MRR | CB/E 8012 | 0.0028 | 4.52E-21 |
| M | YCOK | * POWER ALARM | 0.009521 | 1.3E-19 |
| M | DY | DY/A-LE/D F | 0.010753 | 5.51E-19 |

EVENT CORRELATION

BACKGROUND OF THE INVENTION

1. Field of the Invention

This invention relates to the operation of telecommunications network management systems.

2. Related Art

These systems are used for monitoring, and in some cases also controlling, the operating states of interacting network elements found in the communications networks. In a network management system, monitoring devices sense the operating states of the various network elements and send signals to a network manager in response to significant events in the operation of their respective equipments. Signals may also be sent by human agency to report conditions in the equipment. The term "event" will be used in this specification to signify any state, or change in state, causing such a signal to be sent. In general these events will be faults and the monitoring devices will be fault detectors for sending alarm signals to the network management system in the event of a fault being detected.

For example, in a telecommunications network, an alarm signal caused by the failure of a switching centre would alert the system manager who would arrange for alternative routings to be made and who would also arrange for any necessary repair work to be done on the faulty switching centre. In some systems these responses may be automated, but more usually the faults will require human intervention, the system merely providing to the system manager details of any faults requiring attention. This allows the manager to organise the available resources efficiently, taking into account factors such as safety-criticality, priority, and the whereabouts of field staff.

This also allows non-significant alarms with known causes, such as those caused by equipment having been disconnected for routine maintenance, to be disregarded by the system manager.

It is well established that effects of a network failure, such as the failure of a high bit rate line system, will propagate down through a hierarchy of dependent resources and initiate many nearly simultaneous alarm messages. Time and other resources can be wasted by investigating the sources of all the alarms if the underlying cause has not been identified.

A fault may affect all equipment directly connected to the source of the fault, or all equipment at one geographic location, (although they may be topologically remote from each other) or all equipment of a specific type. For example, external radio interference could affect all radio links in the network operating on a specific frequency within radio range of the source of interference although, from the point of view of connectivity of the network, they may appear remote from each other. Based upon this understanding it is known that alarm messages that occur with close temporal proximity will tend to be associated or correlated.

The size of any temporal window within which alarm messages are considered as correlated has to be optimised—if it is set too large, the chance of alarm messages from unconnected resources arriving within the temporal window increases; if it is set too small, only a subset of the dependent alarm messages might arrive within the temporal window.

In certain circumstances, related faults may only be detected by the system at a later time. For example, this will be the case if an equipment not in operation at the time of the initial fault later attempts to establish contact with the failed equipment.

The operator of the network will be able to determine an appropriate window size according to the characteristics of the network. This will depend on the nature of the network and the faults being monitored within it. In circumstances where faults are reported to the system by human agency rather than automatically, or in which their exact timing is difficult to measure, the window may be of the order of hours, or even days, whereas for systems continuously and automatically monitored a suitable time window may be measured in seconds.

Of course, the mere fact that two events have occurred together on one occasion is not necessarily indicative that there is a causal relationship between them. Whatever optimised temporal window is selected, there remains a finite probability that two or more independent alarm hierarchies will report within the same temporal window.

For convenience in the following discussion, events occurring in the same temporal window will be referred to as simultaneous.

Although temporal correlation within a single window is a simple technique to implement, it provides no great confidence that a dependency actually exists between alarm messages. Simultaneity cannot prove dependency and hence cannot identify a cause and effect relationship between alarm messages.

Network management systems are known in which these problems have been approached by building up a computer model of the network, or relying on the knowledge of the operators. In an article entitled "Knowledge and Data Engineering of a Telecommunications Network" by Kerschberg et al. (Proceedings of the 9th International Conference on the Entity-Relationship approach, Lausanul, October 1990 pages 225–269) this problem is discussed. Knowledge of the network layout is used to identify which of several alarms are related to each other. Another paper: Wolfson et al. "Managing Communication Networks by Monitoring Databases" (IEEE transactions on Software Engineering Vol 17 No. 9, September 1991 pages 944–953) describes suitable protocols for use in such a knowledge-based system. However, this approach requires detailed and up to date knowledge of the network and its accuracy depends on recognition on all of the factors which may be involved. Moreover, any such model would be specific to the individual equipment, and have no general applicability. The present invention addresses these disadvantages by employing an empirical approach to identification of related alarm events.

SUMMARY OF THE INVENTION

According to a first aspect of the present invention, there is provided a method for automatically processing alarm signals in a network management system for a telecommunications network, said alarm signals being generated in the telecommunications network as a result of alarm conditions occurring in a plurality of components of the telecommunications network, said method comprising the step of transmitting alarm signals from the telecommunications network to the network management system, characterised by the further steps of storing historical data concerning the times at which alarms conditions occur in the telecommunications network during a reference time period in a store forming part of the network management system, identifying alarm conditions occurring in the telecommunications network within a predetermined temporal window, correlating the identified alarm conditions by analysing the historical data to determine the statistical probabilities of pairs of the identified alarm conditions occurring by chance within the same temporal window, and displaying at least some of the statistical probabilities on a display device of the network management system.

By using historical alarm condition data in this way a probable relationship between alarm conditions can be identified. Such a relationship can be identified through the use of a historical temporal correlation technique, according to the present invention, without prior knowledge of any relationship between components of the network.

This invention removes the need to build up a model of the network in advance. It identifies alarm conditions which are likely to be related, in the sense either that one is a direct consequence of the other, or that they have some common underlying cause.

Preferably the method includes the steps of selecting one of the identified alarm conditions, and for each of the remaining identified alarm conditions, determining the statistical probability of that alarm condition and the selected alarm condition occurring by chance in the same temporal window.

Advantageously it also includes the step of ranking the statistical probabilities in ascending order of magnitude.

Conveniently the method further comprises the step of identifying the statistical probabilities which are below a predetermined threshold value.

In one arrangement according to the invention, the reference time period is divided into a plurality of temporal windows of equal duration and the statistical probability of a pair of alarm conditions $AR_m$ and $AR_n$ occurring by chance in the same temporal window is determined by the following expression:

$$\frac{k!}{p!(k-p)!} r^p (1-r)^{(k-p)}$$

where k=number of temporal windows in which $AR_m$ occurs.

r=probability of $AR_m$ being active in one of the temporal windows p=number of temporal windows in which events $AR_m$ and $AR_n$ both occur;

when testing the dependency of $AR_n$ upon $AR_m$.

The reference time period may be fixed, or it may be continuously updated by periodically repeating the step of storing historical data relating to the times at which alarm conditions occur, by adding data relating to alarm conditions occurring within the predetermined temporal windows.

Analysis may be done retrospectively, after the faults causing the alarm conditions have been cleared, so that the root cause of the fault can be identified thereby identifying the unreliable component causing the others to fail.

Alternatively, analysis may be done in real time, during the fault condition, in order to locate and repair the cause of the failure, which may result in the clearance of the other fault reports without a technician's attendance being required.

The invention relies on an analysis of the statistical probability of the simultaneous occurrence of the alarm conditions. In essence, it relies on the fact that there is a very low probability of two independent alarm conditions, both themselves rare, occurring simultaneously. It follows that if there is nevertheless a history of two rare alarm conditions occurring simultaneously, it is probable that the alarm conditions are not independent, and that there is a relationship between them. The method may be used to compare alarm conditions selected pair-wise by the operator for possible matches, but in another arrangement the comparison is made between all alarm conditions occurring simultaneously, which are then ranked in order of their calculated probability of having occurred together at one time by chance. These will generally fall into two groups, those with a high probability of having occurred together by chance, and those with a much lower probability, indicating that their simultaneity is unlikely to be a random coincidence, and that it is likely that there is a relationship between them. For a large network with many potential relationships to be assessed, some way of distinguishing such events is desirable.

The method may include the display of alarm conditions in rank order, highlighting correlated alarm conditions on a screen display, or displaying only alarm conditions which are correlated. The threshold level below which a causal relationship is likely may be predetermined, or it may be varied depending on the pattern of probabilities determined on a case-by-case basis. This threshold level can determine which alarm conditions are to be displayed or highlighted. Two or more thresholds may be used, to identify different levels of certainty in the correlation.

Two or more thresholds may be used, to identify different levels of certainty in the correlation.

Although the reference time period may be fixed it is preferable for the data to be continuously updated. This allows the database to become larger, and more reliable as it is used.

In some circumstances there may be a systematic delay between a report of a cause and a report of an effect, or between reports of two effects from a common cause. In systems where this is likely, the method may further comprise the step of selecting signals relating to a plurality of the components within the a predetermined time of each other, wherein signals occurring within a second, shorter, predetermined time of each other are disregarded, thereby detecting signals occurring spaced apart by a delay falling within the range lying between the two predetermined times.

The process may be repeated for a plurality of different delay times.

According to a second aspect of the invention there is provided a network management system for automatically processing alarm signals generated by monitors as a result of alarm conditions occurring in a plurality of components of a telecommunications network, said network management system comprising means for receiving said alarm signals, characterised in that the network management system further comprises means for storing historical data concerning the times at which alarm conditions occur in the telecommunications network during a reference time period, means for correlating alarm conditions identified as occurring within a predetermined temporal window, said correlating means being arranged to determine the statistical probabilities of pairs of the identified alarm conditions occurring by chance within the some temporal windows and means for displaying at least some of the statistical probabilities determined by the correlating means.

BRIEF DESCRIPTION OF THE DRAWINGS

The invention will now be described by way of example with reference to the accompanying drawings, in which:

FIG. 3 is a diagrammatic representation showing the network of FIG. 1 with the interdependencies determined by the embodiment of the method of the invention;

FIGS. 4a 4b and 4c show dependency 'league tables' representative of the results obtainable by the method of the invention;

FIGS. 5a and 5b are representation of a display produced by the method of the invention, performing a second exemplary correlation according to the invention.

DETAILED DESCRIPTION OF EXEMPLARY EMBODIMENTS

Figure 1:
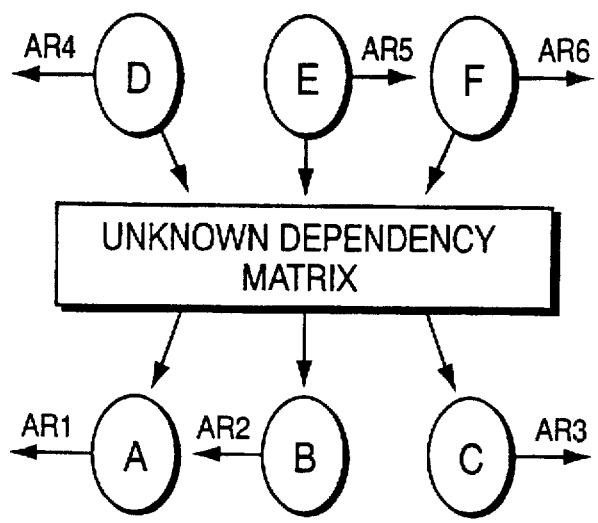
FIG. 1 is a diagrammatic representation of a simple telecommunications network to which an embodiment of the method of the invention is to be applied for illustrative purposes to determine the interdependency.

To assist the understanding of this description of embodiments of the invention it will first be applied to the simple network of FIG. 1 which has only six resources A,B,C,D,E and F and a reference time period divided into only ten temporal windows (t-9 to t0).

AR1, AR2, AR3, AR4, AR5, AR6 are the possible alarms generated by the resources.

Figure 2:
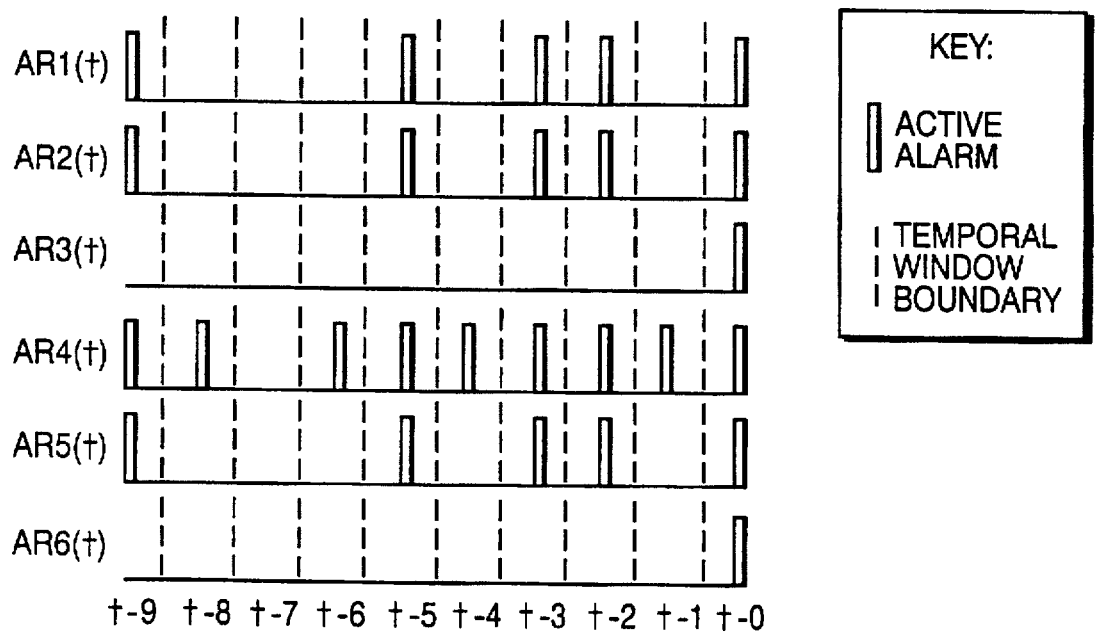
FIG. 2 is a diagrammatic representation of illustrative historical alarm data for the network of FIG. 1.

FIG. 2 shows an exemplary historical sequence of the alarm messages which are taken to have arrived from each resource over the reference time period.

Following the method of the invention, an event occurrence is selected by the operator for analysis. In this example alarm AR1 occurring in temporal window t0 is selected. In this example all other events AR2 to AR6 occurred, simultaneously with AR1, in this window.

The probability (r) of each event occurring is obtained from the historical data by calculating the number of windows in which it occurred (X) divided by the total number of windows in the reference time period (n), i.e. 0.5 for AR1, AR2 and AR5; 0.1 for AR3 and AR6 and 0.9 for AR4.

Events AR2, AR4 and AR5 each occur simultaneously with AR1 five times, whilst AR3 and AR6 occur simultaneously with AR1 only once.

A dependency between two resources will tend to exist if their respective historical alarm sequences have a low probability of being similar by pure chance.

The probability of two historical alarm sequences, $AR_m(t)$ and $AR_n(t)$, being similar by chance may be calculated from the Binomial distribution:

$$P(AR_m(t) \text{ and } AR_n(t) \text{ similar}) = \frac{k!}{p!(k-p)!} r^p (1-r)^{(k-p)}$$

where:

k=Number of temporal windows where $AR_n$ is active.

p=Number of temporal windows where $AR_m$ and $AR_n$ are active r=Probability of $AR_m$ being active when testing dependency of $AR_n$ upon $AR_m$.

r is determined empirically by the method, by calculating x/n, where n is the total number of temporal windows, and x is the number of windows in which ARm is active. Having calculated the probability of each pair of alarms ARm, ARn occurring together by chance, the pairings can be ranked in order of their probability to form a 'league table' of relatedness.

Figures 3, 4A:
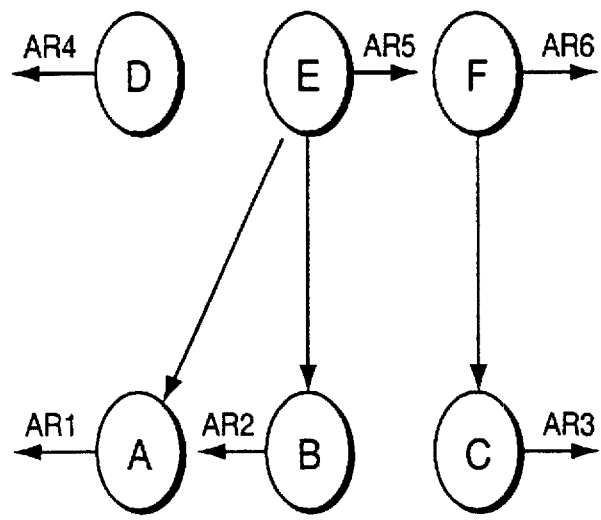

The probabilities of correlation as given by the formula above are shown in the tables of FIG. 4a to 4c, in increasing order of size. It will thus be readily seen from FIG. 4a that the least likely alarms to have occurred simultaneously with AR1 by chance (and thus the most likely to be related), are AR2 and AR5.

A decision thresholding can be applied to determine where the break point between a dependent and non-dependent probability should lie. This threshold may be predetermined, or it may be calculated on the basis of the clustering of results. For example, FIG. 4a shows the dependency league table produced by performing the historical temporal correlation of AR1(t) with all resources shown in FIG. 1.

AR2 and AR5 can be shown to fall within the same dependency hierarchy as AR1 itself.

The double line in FIG. 4a indicates where the dependent/non-dependent threshold should be applied. The probability of alarms being similar are clustered in two groups with a change by an order of magnitude across this threshold. In an operator's display, the area of the screen 2 above the threshold might be highlighted in some way. Alternatively, the correlated events may be the only ones displayed.

The method can be repeated selecting another alarm for comparison against the others.

For AR3 it can be determined that the probability of random correlation with AR6 is 0.1, whilst the probability of random correlation with any other resource is greater than 0.3 as shown in FIG. 4b. Similarly, using AR4, it can be determined that all correlations have probabilities of random occurrence of at least 0.24. It can thus be seen that event AR4 is not correlated with any other. These results are shown in FIG. 4c.

In the simple network of FIG. 1, one can see from visual inspection of FIG. 2 that these results are intuitively reasonable. A visual inspection of all historical alarm messages shows that the historical pattern of AR1(t) is similar to those of both AR2(t) and AR5(t) but is very different from those of AR3(t), AR4(t) and AR6(t). AR3(t) has a pattern similar to that of AR6(t) but is very different to all other alarm sequences.

Although all resource alarms were temporally correlated in window t0, the historical temporal correlation of these alarm sequences would show that AR1 and AR2 were probably related to AR5 and that AR3 was probably related to AR6 (FIG. 3). No alarms appeared to be related to AR4.

However, in more complex systems having perhaps many hundreds of resources, such visual analysis is impossible.

Moreover, in real networks alarm signals occur at a much lower frequency than in the example and thus the number of time frames needed to provide a statistically useful database will be very large. Furthermore, although it would be possible for a skilled operator to manually sub-group many of these alarms, the data is not presented in prior art systems in a way that enables the most significant alarm (ie. the one upon which most other alarms are dependent upon) to be identified. The method of the invention is thus particularly suited for use in large systems where the number of possible correlations is too great to group intuitively.

When the probability of an event occurring (r) is small the Binomial distribution used in the first example approximates to the Poisson distribution:

$$P(AR_m(t) \text{ and } AR_n(t) \text{ similar}) = \frac{(k\,r)^p}{p!} e^{-(k\,r)}$$

As a second example, using real data, a one-off historical temporal correlation was performed between a selected resource in the BT Network Monitoring System (NETMON) which reported a fault at 10:53:43 on a certain date, and all other resources in the system reporting within the same window. The historical database comprises all December 1990 alarm data (fault reports), using a 150 second window size, thus giving 17,856 windows. The national NETMON database for December 1990 holds about $2\times10^6$ alarms from about 40,000 resources. Clearly the identification of historical patterns from such quantities of data cannot be done by simple inspection In this example a threshold value will be determined in advance. From the figures above it can be seen that the average number of alarms per resource in the reference period is approx. 2,000,000/40,000=50, and the average probability of occurrence in any given temporal window is thus 50/17856=0.0028. Thus the probability of any randomly selected pair of resources reporting simultaneously in a given window is of the order of $(0.0028)^2=7.8\times10^{-6}$. There are $(40,000)^2=1.6\times10^9$ possible pairings of resources, so there will be approximately 12,500 random correlations in any given temporal window.

To avoid being overwhelmed by these random correlations, a threshold value is chosen which only reports the most statistically significant correlations. In the following example a threshold probability of $10^{-8}$ is used.

Figure 6:
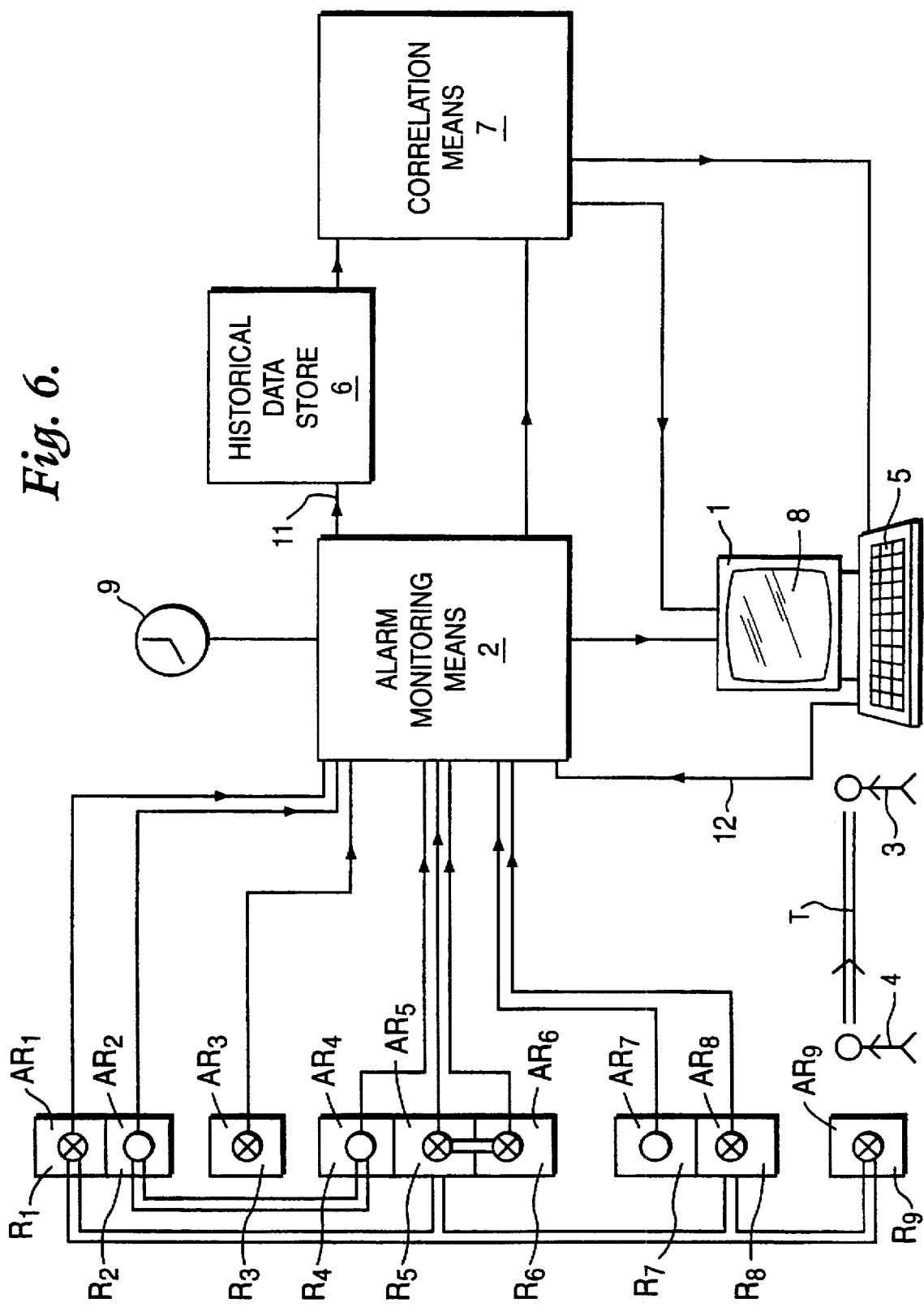
FIG. 6 is a diagrammatic representation of an apparatus for performing an embodiment of the invention.

FIGS. 5a and 5b show the top of the dependency "league table" resulting from performing the correlation method according to the invention on this data. This may be displayed on screen 1 (FIG. 6). The top entry in the league tables is in respect of the fault reported by the selected resource. The threshold value lies off the bottom of this fragment of the table.

The table has five columns. The first column indicates the region in which the fault is located: NE=North East, S=Scotland, M=Midlands, L=London, NW=North West.

The second column specifies the actual origin of the alarm.

The third column indicates the nature of the fault prefixed by a two letter code indicating the location of the fault. (Note that the system may be alerted to a fault at a location remote from the fault itself.

The fourth column calculates the probability of the alarm fault occurring by chance.

The fifth column gives the correlation probability.

From their positions in this league table, it becomes easy to identify many associations between resources within an alarm dependency hierarchy, which would not otherwise be apparent.

Faults within this hierarchy are seen having the prefix codes (column 3) for Leicester (LE), Leeds (LS), Sheffield (SF), Edinburgh (EH), Cambridge (CB), London (L), Manchester (MR), etc. Some of the correlations revealed by this league table have obvious causes: for example the first thirteen all occur in the same location as the selected source. However, it is also possible to see that alarms emanate from three line systems all radiating from the same place coded LE/D (Leicester D): Leicester D—Derby F, Leicester D—Leeds G and Leicester D—Sheffield E. The apex of this dependency hierarchy appears to be a power related effect.

The results from this exemplary historical temporal correlation suggest that a problem with the power supply ar the location coded LE/D is responsible for many alarms occurring over a wide geographical area. This conclusion could not have been drawn by looking at the results of a prior art single window temporal correlation because of the large number of unrelated alarms also present, but can be identified more easily from the ranking determined by the method of the invention.

Post analysis revealed that in this case a fault was indeed present in the power supply to part of the network in the Leicester area.

The principles of historical temporal correlation used in the present invention can be used by a network management system as a technique for self-learning of alarm dependencies. Artificial neural network principles provide one framework within which the self learning of alarm dependencies could function.

By recording correlations as they are identified, the system can build up a computer model of the dependencies so that when particular patterns of alarms next occur it can more readily identify alarms as being related.

A network management system according to the invention is shown in FIG. 6. There is shown a network of resources R1 to R9 having a number of interconnections. Resources R1 to R8 have respective monitors AR1 to AR8 which report alarm conditions to the network monitoring means 2 for display to the operator 3 on screen 1. Resource R9 is not directly connected to the management system but field operative 4 discovering a fault occurring in resource R9 can advise the operator 3, e.g. by telephone connection T, so that the fault condition can be reported to the monitoring means 2 by means of data input means 5 and input link 12.

Under the control of clock 9, the alarm conditions are periodically reported through updating link 11 to store 6, with their time of occurrence.

On observing from screen 1 a fault with which he or she wishes to correlate other faults, the operator 3 may use the input means 5 to select an alarm condition to be correlated. The information on the current alarm conditions is extracted from the monitoring means 2 by correlation means 7. Correlation means 7 extracts the historical data from store 6 and performs a statistical analysis (as described above) to calculate for each alarm currently reported to the monitoring means 2, the theoretical probability of it occurring at the same time as the selected alarm. The alarms are displayed in ascending order of probability on screen 1. Alarms having a probability of correlation below a predetermined value are identified by highlighting 8.

The monitoring means 2, screen 1, input link 12, clock 9, updating link 11, store 6 and correlating means 7 may be implemented as a computer provided with appropriate software.

I claim:

1. A method for automatically processing alarm signals in a network management system for a telecommunications network, said method comprising:

generating alarm signals in the telecommunications network as a result of alarm conditions occurring in a plurality of components of the telecommunications network, transmitting alarm signals from the telecommunications network to the network management system, storing historical data concerning the times at which alarm conditions occur in the telecommunications network during a reference time period in a store forming part of the network management system, identifying alarm conditions occurring in the telecommunications network within one of a number of predetermined temporal windows, correlating the identified alarm conditions by analysing the historical data to determine the statistical probabilities of pairs of the identified alarm conditions occurring by chance within the same temporal window, and displaying at least some of the statistical probabilities on a display device of the network management system.

2. A method as in claim 1 further comprising:

selecting one of the identified alarm conditions, and for each of the remaining identified alarm conditions, determining the statistical probability of that alarm condition and the selected alarm condition occurring by chance in the same temporal window.

3. A method as in claim 2 further comprising:

ranking the statistical probabilities in ascending order of magnitude.

4. A method as in claim 3 further comprising:

identifying the statistical probabilities which are below a predetermined threshold value.

5. A method as in claim 4 further comprising:

highlighting on the display device said statistical probabilities which are below the predetermined threshold value.

6. A method as in claim 1 wherein:

the reference time period is divided into a plurality of temporal windows of equal duration and the statistical probability of a pair of alarm conditions $AR_m$ and $AR_n$ occurring by chance in the same temporal window is determined by the following expression:

$$\frac{k!}{p!(k-p)!} r^p (1-r)^{(k-p)}$$

where:

k number of temporal windows in which $AR_m$ occurs r probability of $AR_m$ being active in one of the temporal windows p=number of temporal windows in which events $AR_m$ and $AR_n$ both occur;

when testing the dependency of $AR_n$ upon $AR_m$.

7. A method as in claim 1 wherein:

the step of storing historical data relating to the times at which alarm conditions occur is repeated periodically by adding data relating to alarm conditions occurring within the predetermined temporal windows.

8. A network management system for automatically processing alarm signals, said system comprising:

means for generating alarm signals generated by monitors as a result of alarm conditions occurring in a plurality of components of a telecommunications network, receiving means for receiving said alarm signals, storing means for storing historical data including a representation of the times at which alarm conditions occur in the telecommunications network during a reference time period, correlating means for correlating alarm conditions identified as occurring within a predetermined temporal window, said correlating means including means for determining the statistical probabilities of pairs of the identified alarm conditions occurring by chance within the some temporal window, and means for displaying at least some of the statistical probabilities determined by the correlating means.

9. A network management system as in claim 8 wherein the network management system includes:

means for permitting an operator of the system to select one of the identified alarm conditions, said correlating means including means for determining the statistical probability of each of the remaining alarm conditions occurring by chance in the same temporal window as the selected alarm condition.

10. A network management system as in claim 9 wherein:

the correlating means includes means for ranking the statistical probabilities in ascending order of magnitude.

11. A network management system as in claim 8 wherein:

the reference time period is divided into a plurality of temporal windows of equal duration, and the correlating means includes means for determining the statistical probability of a pair of alarm conditions $AR_m$ and $AR_n$ occurring by chance in the some temporal window by the following expression:

$$\frac{k!}{p!(k-p)!} r^p (1-r)^{(k-p)}$$

where:

k=number of temporal windows in which $AR_m$ occurs r=probability of $AR_m$ being active in one of the temporal windows p=number of temporal windows in which events $AR_m$ and $AR_n$ both occur when testing the dependency of $AR_n$ upon $AR_m$.

12. A network management system as in claim 8 wherein the network management system includes means for periodically supplying data held in the receiving means to the storing means.

13. A network management system as in claim 8 wherein the network management system includes means for manually supplying data on alarm conditions to the receiving means.

14. A self-learning adaptive network management system comprising:

network condition detectors distributed within the network and disposed to generate respectively corresponding alarm signals in response to detected abnormalities;

an alarm monitoring means connected to receive said alarm signals and to assign the occurrence of each to an associated time;

a historical data storage means connected to receive and store historical data representing the identity of alarm signals historically received in the past from the network;

correlation means connected to process said stored historical data and generate statistical data therefrom representing the probability of a predetermined plurality of predetermined alarm signals independently occurring within the same time window by chance; and means for using said statistical data to identify and display concurrently received new incoming alarm signals that are most probably not independent occurrences but, instead, are most probably inter-dependent related alarm conditions.

15. A self-learning adaptive network management system as in claim 14 wherein new incoming alarm signals within a common time window are displayed with a visual indication of the relative probability that such alarms are interdependent related alarm conditions.

16. A self-learning adaptive network management system as in claim 15 wherein said new incoming alarm signals are displayed in a sequence related to the relative probability of such alarms being inter-dependent and related.

17. A self-learning adaptive network management system as in claim 15 wherein a plurality of new incoming alarm signals are visually distinguished on a display if they have a relative probability of being independent occurrences that is below a predetermined threshold.

18. A method for self-learning adaptive network management, said method comprising:

generating alarm signals in response to detected abnormalities within the network;

receiving said alarm signals and assigning the occurrence of each to an associated time;

storing historical data representing the identity of alarm signals historically received in the past from the network;

processing said stored historical data to generate statistical data representing the probability of a predetermined plurality of predetermined alarm signals independently occurring within the same time window by chance; and using said statistical data to identify and display concurrently received new incoming alarm signals that are most probably not independent occurrences but, instead, are most probably inter-dependent related alarm conditions.

19. A method as in claim 18 wherein new incoming alarm signals within a common time window are displayed with a visual indication of the relative probability that such alarms are inter-dependent related alarm conditions.

20. A method as in claim 19 wherein said new incoming alarm signals are displayed in a sequence related to the relative probability of such alarms being inter-dependent and related.

21. A method as in claim 19 wherein a plurality of new incoming alarm signals are visually distinguished on a display if they have a relative probability of being independent occurrences that is below a predetermined threshold.

* * * * *